Patented Oct. 4, 1932

1,880,502

UNITED STATES PATENT OFFICE

ALBERT A. SHANNON, OF ROCHESTER, NEW YORK, ASSIGNOR TO EASTMAN KODAK COMPANY, OF ROCHESTER, NEW YORK, A CORPORATION OF NEW YORK

PRINTING INK FOR PHOTOGRAPHIC FILM

No Drawing.   Application filed September 22, 1931.   Serial No. 564,467.

This invention relates to inks for printing on sheets of cellulose acetate or cellulose nitrate compositions, and particularly for printing on the support side of photographic film. Its object is to provide an ink which will remain on the film during the development and other processes to which the film is subjected, and which will not be removed by wiping with carbon tetrachloride or similar cleaning fluid.

In the motion picture film industry it is desirable that numbers indicating the footage of the film be printed along the edge of the support side of the film, that is, the side of the film which does not bear the photographic emulsion. The ink used in this printing must remain on the film during and after the development and other processes to which the film is subjected, and should be resistant to the cleaning processes to which the support side of the film is subjected during its life. It is customary to clean the support side of motion picture films by wiping with carbon tetrachloride or similar cleaning fluid. The inks which have hitherto been used for printing on motion picture film were not sufficiently resistant to wiping with carbon tetrachloride, some of the ink being removed by the carbon tetrachloride each time the film was cleaned. The ink which is the subject of this invention remains on the film during its development and other processes to which it is subjected, and shows excellent resistance to wiping with carbon tetrachloride.

My novel ink, which can be used for printing on the support side of either cellulose acetate film or cellulose nitrate film, consists of a solution of cellulose acetate and an azo dye of suitable color, such as black, in a mixture of ethylene glycol monomethyl ether and the acetate of ethylene glycol monomethyl ether. The proportions which I prefer to use are:

| | |
|---|---|
| Cellulose acetate | 1.6 grams |
| Ethylene glycol monomethyl ether | 50 cc. |
| Acetate of ethylene glycol monomethyl ether | 50 cc. |
| Azo dye | 10 grams |

However, I may vary the proportions of the ingredients within reasonable limits although those given are preferred. The ink may be made by dissolving the cellulose acetate in the mixture of ethylene glycol monomethyl ether and acetate of ethylene glycol monomethyl ether, preferably by means of tumbling, then adding the dye and continuing the mixing (tumbling) until the dye is completely dissolved. The ink is then carefully filtered and may be bottled for use.

It will be noted that my ink is distinguished from previous inks in the art in that, among other things, the solvents employed have a rather low boiling range. For instance, the ethylene glycol monomethyl ether boils at 118° C., the acetate of that ether boils at 120° C. and substantially all of a 50—50 mixture of the two distils over below 145° C. In addition, these particular solvents have unusual solvent power which adapts them for the preparation of inks highly suitable for use upon cellulose acetate or nitrate support or sheeting.

While my novel ink is particularly suitable for printing on the support side of motion picture film, it will be understood that it may also be used for printing on any other sheets, films, coatings or formed objects of cellulose acetate compositions or cellulose nitrate compositions.

What I claim as my invention and desire to be secured by Letters Patent of the United States is:

1. An ink for printing on cellulose ester compositions, consisting of an azo dye, cellulose acetate, ethylene glycol monomethyl ether, and the acetate of ethylene glycol monomethyl ether.

2. An ink for printing on cellulose ester compositions, consisting of an azo dye, cellulose acetate, and approximately equal volumes of ethylene glycol monomethyl ether and the acetate of ethylene glycol monomethyl ether.

Signed at Rochester, New York, this 15th day of September 1931.

ALBERT A. SHANNON.